United States Patent [19]

Melvin

[11] Patent Number: 5,363,159
[45] Date of Patent: Nov. 8, 1994

[54] THREE-DIMENSIONAL PHOTOGRAPH

[76] Inventor: Kevin Melvin, 22 Dellwood Crescent, Winnipeg, Manitoba, Canada, R3R 1S7

[21] Appl. No.: 145,191

[22] Filed: Nov. 3, 1993

[51] Int. Cl.⁵ .................................... G03B 29/00
[52] U.S. Cl. .......................... 354/76; 355/47; 346/107 R
[58] Field of Search .............. 354/75, 76, 77, 290, 354/291, 292; 355/52, 22, 47; 346/107 R

[56] References Cited

U.S. PATENT DOCUMENTS 5,040,005  8/1991  Davidson et al. ................. 354/76
5,280,305  1/1994  Monroe et al. ............... 346/107 R

OTHER PUBLICATIONS

Brochure–Cyberware Rapid 3D Color Digitizer Model 3030 (4 pages), Aug. 1990.

*Primary Examiner*—Howard B. Blankenship
*Attorney, Agent, or Firm*—Adrian D. Battison; Murray E. Thrift; Stanley G. Ade

[57] ABSTRACT

A three-dimensional photographic technique comprises scanning the outside surface of the three-dimensional surface such as a human subject using a color digitizer which generates spatial and color data relating to the outside surface. The spatial data is used to generate a mold having a concave surface corresponding to the outside surface of the subject. A thin hollow shell of transparent plastics material is molded in the mold to define an outer surface of the shell which corresponds to the outer surface of the subject. The photographic material is applied on the inside surface of the hollow shell and is exposed using an image manipulation system and fiber optic transportation system which extracts the light from a screen and transmit it to a position adjacent the outside surface of the hollow shell to provide the required colored image on the photographic material for display through the transparent material of the hollow shell.

11 Claims, 2 Drawing Sheets

THREE-DIMENSIONAL PHOTOGRAPH

THREE-DIMENSIONAL PHOTOGRAPH

This invention relates to an improvement in the field of photography and particularly to a three-dimensional photograph, that is, a photograph having a photograph surface which is three-dimensional and is shaped to define a representation of the spatial configuration of an outer surface of the photographed object, the outer surface being colored to provide a representation of the color of the outer surface of the object.

Traditionally the photograph has been limited to a flat two-dimensional print. Even stereoscopic or holographic pictures include a final print which is still based on a two dimensional or flat form.

Sculpture has been used to generate three-dimensional representations of objects or more particularly human subjects but sculpture is generally not intended to be an exact representation of the human subject in view of the difficulty of generating such an exact representation and in view of the artistic process which incorporates deliberate subjectivity.

Up until now, therefore, it has not been possible to generate an exact photographic representation in three dimensions of a human subject or similar object having an outer surface which is shaped and colored.

SUMMARY OF THE INVENTION

It is one object of the present invention, therefore, to provide an improved method of photography which enables the generation of a three-dimensional photograph.

According to the invention, therefore, there is provided a method of manufacturing a three-dimensional photograph of an outer surface of a three-dimensional object comprising scanning the object using a three dimensional color digitizer to generate spatial data representative of the three-dimensional shape of the outer surface of the object and color data representative of the color of the outer surface of the object, the color data being related to the spatial data, using the spatial data to generate a body having a three-dimensional body surface representative of the outer surface of the object, applying a photographic material to the body so to be visible at the body surface, and using the color data and its relation to the spatial data to expose the photographic material to generate color on the photographic material representative of the color on the outer surface of the body.

Preferably the object is formed as a hollow shell of transparent material having an outer surface of the hollow shell defining the body surface and an inner surface of the hollow shell, spaced away from the outer surface simply by the thickness of the hollow shell, which carries the photographic material.

The new form of photography of the present invention is in fact therefore a series of processes encompassing several technologies. The final outcome is a product which is a "true" photographic reproduction of the subject including its three dimensional shape, contours and size, although of course the size can be varied to provide a scaled photograph if required.

The method of the present invention utilizes a machine which has only recently become available that is the Cyberware color 3D digitizer which is available from Cyberware Laboratory Inc. Montera, Calif. 93940 the details of which are available to the person skilled in the art.

As this machine is now currently commercially available and publicly disclosed, there is no necessity to fully the describe the details of this device in the present application.

The method of the present invention will therefore produce a colored three-dimensional photographic reproduction of the object or subject with a scanned angle of up to 360° but more preferably of 180°. The three-dimensional photograph for representation can be of exact dimension of the subject so that it can be reduced to a larger or smaller scale as required. The method provides a photograph with the length, width, weight and depth following exactly the prescribed contours of the subject. The color is preferably uniformly consistent with the color of the subject but can be modified to provide a combination of colors if desired. The finished three-dimensional photograph can be fixed or attached to a flat background or support suitable for framing. The background can be of a basic color or can include background scenery preferably reproduced photographically in a two-dimensional form.

As an alternative the finished three-dimensional photograph can be formed into a mask to be worn over the face of a user in the same manner as a traditional mask. Eye, nose and mouth holes can be formed in the mask. The mask can be attached to the head of the user in the conventional manner using elastic cords or similar materials.

One embodiment of the invention will now be described in conjunction with the accompanying drawings in which:

DETAILED DESCRIPTION

Figure 3:
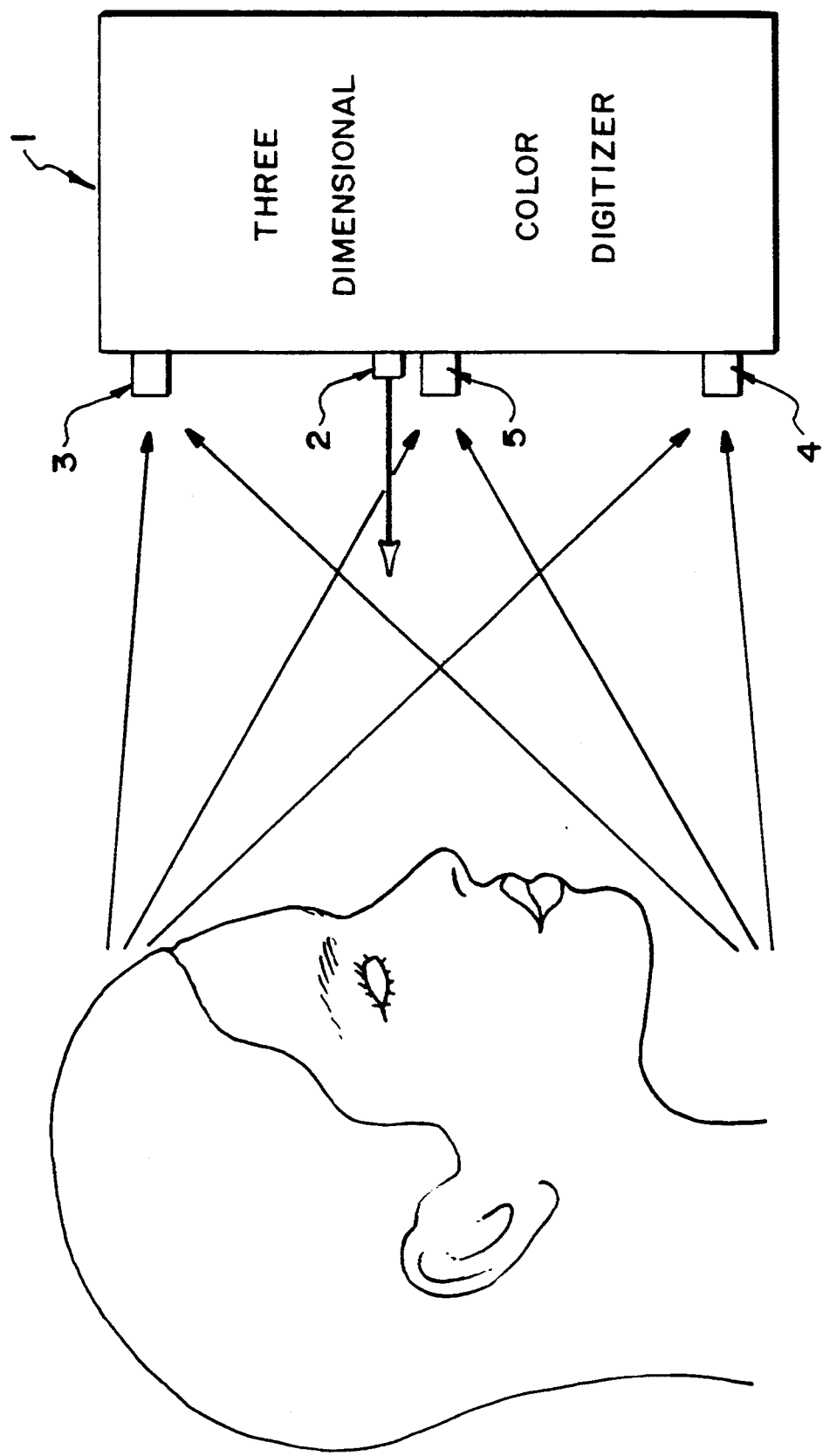
FIG. 3 is a schematic illustration of the step of scanning of an object, that is as shown a human subject.

A rapid 3D color digitizer model 3030 is available from Cyberware. This machine 1 is shown schematically in FIG. 3 and in operation provides a safe low intensity laser 2 which shines onto an object to create a lighted profile. A high quality video sensor captures this profile from two view points indicated schematically at 3 and 4. The system can digitize thousands of these profiles in a few seconds to capture the shape of the entire object. Simultaneously a second video sensor 5 acquires color information. The profile of spatial data is stored and the color data is also stored in association with a spatial data so that each location or coordinate point on the spatial data can be allocated a specific color. The scanning can be effected over a full 360° or more preferably can be limited to one-half of the full periphery that is 180°.

Figure 1:
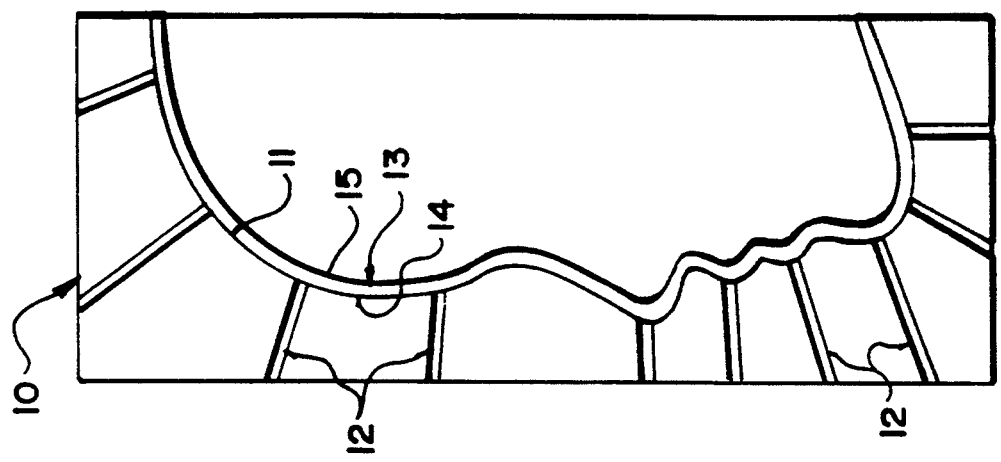
FIG. 1 is a vertical cross-sectional view through a mold showing the step of molding the hollow shell defining the surface of the photograph.

Using the spatial data, a mold is manufactured defining a concave surface which is shaped according to the spatial data to form a reverse image of the object. Numerical controlled milling machines are available controlled by conventional CAD/CAM programs so that the information extracted from the spatial data can be used to generate the reverse mold surface. It is within the skill of one in this art to generate a program to manufacture the mold in this manner using the commercially available programs and the commercially available numerical controlled milling machines. The mold is manufactured from a material which is easy to machine. In cases where the mold will be used for only a limited number of photographs to be manufactured, the mold can be formed from a relatively soft material. The mold is shown in FIG. 1 and indicated at 10 with a machined inner surface 11 which is shaped to follow the contours of the outer surface of the object as defined by the spatial data generated by the color digitizer. The mold includes vacuum holes 12 allowing the mold to be used to vacuum form a thin sheet 13 of transparent plastics material into a thin hollow shell having an outer surface 14 and an inner surface 15. In some other embodiments this forms this shell into a rigid structure which is resistant to flexing. In an alternative arrangement, the plastics material may be flexible while of course retaining the molded shape sufficiently to be self supporting. The outside surface 14 of the hollow shell thus follows substantially exactly the contours of the outer surface of the object as scanned by the color digitizer.

The spatial and color data are used from the color digitizer to generate a manipulated image of the object for color purposes. Software is available or adaptable for a graphic work station and is used to "fix" the image of the object at any desired angle. In the case of a human subject, the desired angle is arranged as a straight ahead front view of the face.

Using the most spatially advanced projection point of the image as a centering point, the spatial information of the top, bottom and sides of the subject are brought forward so as to be of equal value spatially as that of the most advanced point. This applies also the most recessed points which in relation to a human subject are based upon a line running along the temple, behind the cheekbone but in front of the ear and down the sides of the face.

The image is then stretched radiating outwardly 360° from the central point. In the case of the human subject, the central point will be represented by the tip of the nose. This stretching flattens out the contours of the image and releases hidden spatial and color information. This flattening out of the image allows each separate pixel of color and space to occupy its own separate location on a flat two-dimensional representation of the object. As each point is located at a separate location, it does not overlap or obstruct a view of any of the neighboring pixels. In simpler terms the image is unfolded and stretched out from its central point, producing a flat image, thus "metamorphosising" three dimensional space into a two dimensional image.

This stretching or modification of the representation is effected simply by software programming.

Figure 2:
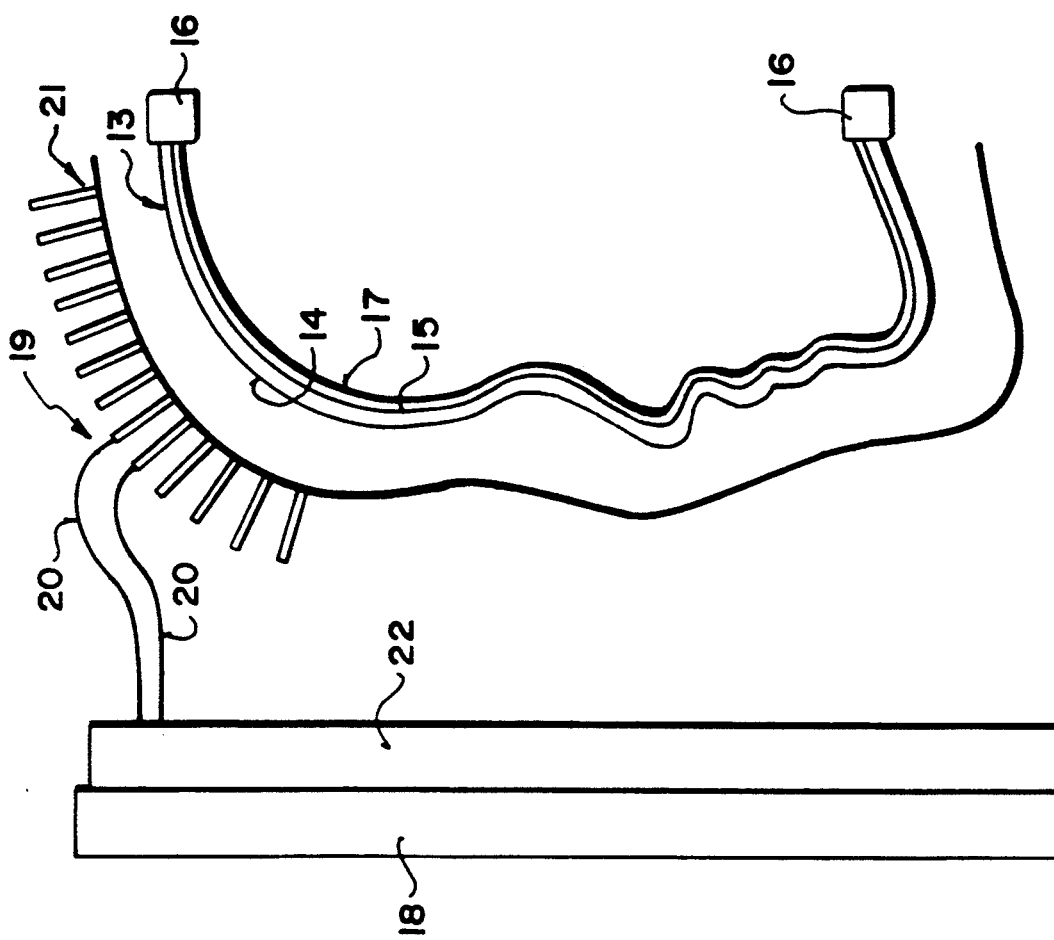
FIG. 2 is a similar vertical cross-sectional view through the shell of FIG. 1 showing the step of generating the color image on the outside surface of the hollow shell.

Turning now to FIG. 2, the hollow shell 13 is removed from the mold and mounted on a support 16. On the inside surface of the hollow shell 13 is applied a photographic layer 17 of a photographic emulsion or material which can be exposed to take up and display the color information from the color data.

In order to apply the color data to the photographic emulsion 17, a color transmission system is provided including a screen 18 and a fiber optic transmission system 19. The fiber optic transmission system comprises a plurality of individual optical fibers 20 provided in an array and mounted on a suitable support shown schematically at 21.

The array is carried on the holder 21 so that the fibers define outward ends which are arranged closely adjacent the outer surface 14 of the hollow shell 13. A second holder 22 supports the input ends of the optical fibers 20 and is arranged to mount these input ends at the screen 18 so as to receive the light therefrom.

The manipulated image is then applied to the screen. The array of the input ends of the fibers is arranged relative to the screen so that each fiber receives the required light from its position on the screen for transmission to the required location at the outer surface of the shell 13. Thus the positions of the input ends of the fibers are arranged based upon the manipulated image. In practice the manipulation is effectively constant or very similar for each scan of a human subject so that the fibers can be arranged approximately in accordance with the manipulation of the image and the outward ends of the fibers can be arranged approximately in accordance with the outer surface of the hollow shell.

The light from the screen 18 is thus emitted into the input ends of the fibers and the light is then transmitted simultaneously from the screen to the outside surface of the hollow shell. The amount of light transmitted is controlled in accordance with the light requirements for the photographic materials on the inside surface of the transparent hollow shell so that an exposure of the materials occurs. The exposed materials are then developed using conventional photographic techniques to display the required colors on the outside surface of the hollow shell.

The developed photographing materials can be spray coated with a covering material to avoid damage. However the materials are, of course, on the inside surface of the hollow shell so that the outside surface is protected by the thickness of the hollow shell.

It will be appreciated therefore that the outside surface of the hollow shell displays both the spatial arrangement and color of an image representing the outside surface of the body which forms the subject of the photographic technique, and the "metamorphosising" of the image from three dimensions to two dimensions allows the conversion from three dimensions to two dimensions and back to three dimensions.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of manufacturing a three-dimensional photograph of an outer surface of a three-dimensional object comprising scanning the object using a three dimensional color digitizer to generate spatial data representative of the three-dimensional shape of the outer surface of the object and color data representative of the color of the outer surface of the object, the color data being related to the spatial data, using the spatial data to generate a body having a three-dimensional body surface representative of the outer surface of the object, applying a photographic material to the body so to be visible at the body surface, and using the color data and its relation to the spatial data to expose the photographic material to generate color on the photographic material representative of the color on the outer surface of the body.

2. The method according to claim 1 wherein the body is formed to define a hollow transparent shell having an outer surface of the shell defining said body surface and an inner surface of the shell spaced from the outer surface by the thickness of the shell, the photographic material being applied on the inside surface.

3. The method according to claim 2 wherein the photographic material on the inside surface of the shell is exposed through the transparent material of the shell.

4. The method according to claim 1 wherein the body is formed by molding within a mold, the mold being formed using the spatial data to cut an inside surface of a mold corresponding to the outer surface of the object.

5. The method according to claim 2 wherein the body is formed by molding within a mold, the mold being formed using the spatial data to cut an inside surface of a mold corresponding to the outer surface of the object.

6. The method according to claim 1 wherein the photographic material is exposed using optical fibers.

7. The method according to claim 2 wherein the photographic material is exposed using optical fibers.

8. The method according to claim 5 wherein the color data is translated using the spatial data to a two-dimensional format and wherein the translated color data is generated onto a two-dimensional screen in the two dimensional format, the optical fibers being provided in an array with each fiber having an input end arranged adjacent the screen to receive colored light therefrom and wherein each optical fiber has an output end arranged adjacent the body surface, the output ends of the array being arranged in a three-dimensional pattern surrounding the body surface.

9. The method according to claim 6 wherein the color data is translated using the spatial data to a two-dimensional format and wherein the translated color data is generated onto a two-dimensional screen in the two dimensional format, the optical fibers being provided in an array with each fiber having an input end arranged adjacent the screen to receive colored light therefrom and wherein each optical fiber has an output end arranged adjacent the body surface, the output ends of the array being arranged in a three-dimensional pattern surrounding the body surface.

10. The method according to claim 2 wherein the shell defines one-half only of a 360° body so the shell extends only around The order of 180° of the body.

11. The method according to claim 10 wherein the object is a human head and the shell represents the face and front half of the head.

* * * * *